US006363514B1

(12) United States Patent
Kawai et al.

(10) Patent No.: US 6,363,514 B1
(45) Date of Patent: Mar. 26, 2002

(54) SOUND REPRODUCING SYSTEM AND METHOD CAPABLE OF DECODING AUDIO DATA EVEN IN CASE OF FAILURE OF DETECTING SYNCWORD

(75) Inventors: Takahiro Kawai; Chuya Hayashi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/225,345

(22) Filed: Jan. 5, 1999

(30) Foreign Application Priority Data

Jul. 14, 1998 (JP) .......................................... 10-199308

(51) Int. Cl.[7] .............................................. H03M 13/33
(52) U.S. Cl. ...................................... 714/798; 714/701
(58) Field of Search ............................... 714/807, 798, 714/701

(56) References Cited

U.S. PATENT DOCUMENTS 5,241,545 A * 8/1993 Kazeki et al. .............. 370/106
5,379,160 A * 1/1995 Otani .......................... 360/49
5,422,894 A * 6/1995 Abe et al. ................. 371/37.4
5,909,465 A * 6/1999 Bottomley et al. ......... 375/227
5,912,902 A * 6/1999 Monroe ...................... 371/30

FOREIGN PATENT DOCUMENTS

| JP | 9-121347 | 5/1997 |
| JP | 9-205371 | 8/1997 |
| JP | 10-13238 | 1/1998 |

* cited by examiner

*Primary Examiner*—Stephen M. Baker
(74) *Attorney, Agent, or Firm*—Burns, Doane, Swecker & Mathis, LLP (57) ABSTRACT

A sound reproducing system that decodes audio data in a frame with which detection of a syncword fails, if a syncword included in a subsequent frame is detected, if correctness of bit stream information in the subsequent frame is proved, and if no CRC error is detected (when CRC is included). This makes it possible to solve a problem involved in a conventional system in that when a unit frame without an error check pattern is input and a synchronization detector produces a synchronization detection error signal, unpleasant sound interruption can take place even if the audio data is correct, because the correctness of the audio data cannot be checked, and hence the audio data cannot be decoded in this case.

12 Claims, 10 Drawing Sheets

SOUND REPRODUCING SYSTEM AND METHOD CAPABLE OF DECODING AUDIO DATA EVEN IN CASE OF FAILURE OF DETECTING SYNCWORD

BACKGROUND OF THE INVENTION

1. Field of the Invention

The present invention relates to a sound reproducing system and sound reproducing method for decoding audio data included in a bit stream of an input audio signal.

2. Description of Related Art

Figure 13:
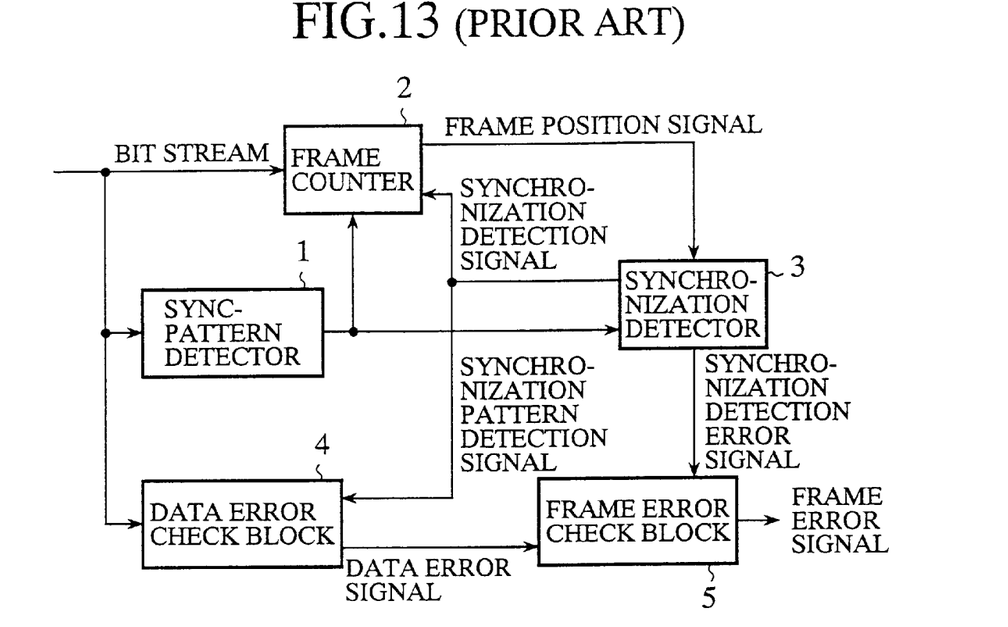
FIG. 13 is a block diagram showing a conventional sound reproducing system.

FIG. 13 is a block diagram showing a configuration of a conventional sound reproducing system disclosed in Japanese patent application laid-open No. 10-13238/1998, for example. In FIG. 13, the reference numeral 1 designates a sync-pattern detector that detects a synchronization pattern at the initial position of each unit frame constituting a bit stream, and produces a synchronization pattern detection signal; 2 designates a frame counter that starts a count processing, when receiving the synchronization pattern detection signal from the sync-pattern detector 1, increments its count value each time it receives the unit frame constituting the bit stream, and outputs the count value as a frame position signal; and 3 designates a synchronization detector that makes a decision as to whether a synchronization state is continued or not on the basis of the output timing of the synchronization pattern detection signal produced from the sync-pattern detector 1, and the output timing of the frame position signal output from the frame counter 2, and outputs a synchronization detection signal in the synchronization state, or a synchronization detection error signal in an asynchronous state.

The reference numeral 4 designates a data error check block that checks data error of an audio signal in the unit frame with reference to an error check pattern in the unit frame, and outputs a data error signal when detecting the data error; and 5 designates a frame error check block that produces a frame error signal when the synchronization detector 3 outputs the synchronization detection error signal and the data error check block 4 outputs the data error signal, thereby causing the decoding of the audio data to be suspended, and that when the data error check block 4 does not output the data error signal, causes the decoding of the audio data to be continued even if the synchronization detector 3 outputs the synchronization detection error signal.

Next, the operation of the conventional sound reproducing system will be described.

Figure 14:
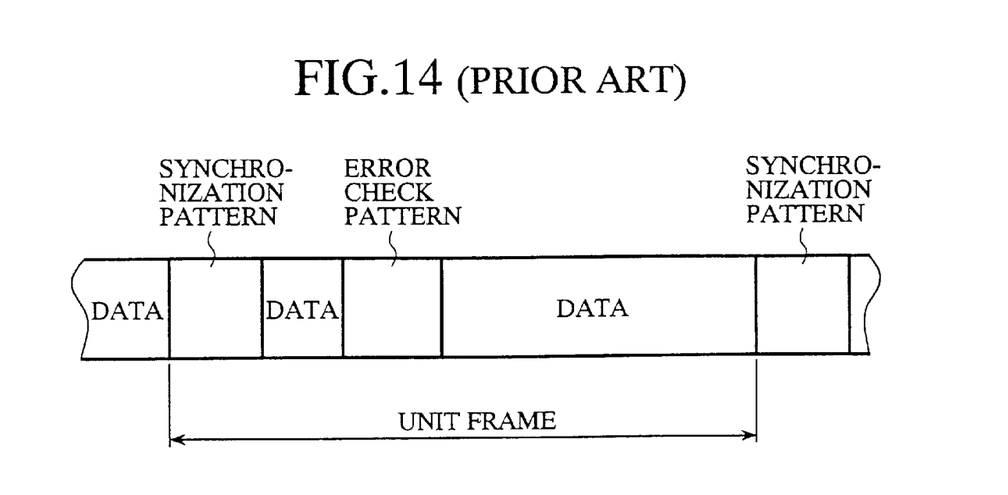
FIG. 14 is a diagram illustrating a frame structure of the bit stream associated with the conventional sound reproducing system.

First, receiving the bit steam from an input terminal, the sync-pattern detector 1 detects the synchronization pattern at the initial position of each unit frame constituting the bit stream (see, FIG. 14). When the sync-pattern detector 1 detects the synchronization pattern, it supplies the synchronization pattern detection signal to the frame counter 2 and synchronization detector 3.

Receiving the synchronization pattern detection signal from the sync-pattern detector 1, the frame counter 2 starts counting and increments the count value every time it receives the unit frame, and supplies the synchronization detector 3 with the count value as the frame position signal for identifying the position of the unit frame.

Thus, when the sync-pattern detector 1 outputs the synchronization pattern detection signal and the frame counter 2 outputs the frame position signal, the synchronization detector 3 monitors whether the output timings of the two signals agree or not. If they agree, the synchronization detector 3 makes a decision that the synchronization state is held, and supplies the synchronization detection signal to the frame counter 2 and data error check block 4. In contrast, if they disagree, the synchronization detector 3 makes a decision that the asynchronous state takes place, and supplies the synchronization detection error signal to the frame error check block 5.

On the other hand, receiving the bit stream from the input terminal, the data error check block 4 checks whether a data error takes place in the audio data in the unit frame with reference to the error check pattern included in the unit frame (see, FIG. 14), and supplies the data error signal to the frame error check block 5 if it detects the data error.

When the synchronization detector 3 outputs the synchronization detection error signal and the data error check block 4 detects the data error signal, the frame error check block 5 produces the frame error signal to cause the decoding of the audio data to be suspended. In contrast, when the data error check block 4 does not output the data error signal, the frame error check block 5 does not outputs the frame error signal and causes the decoding of the audio data to be carried out even if the synchronization detector 3 outputs the synchronization detection error signal, because the audio data itself is correct in this case.

With such a configuration, the conventional sound reproducing system can continue decoding the audio data as long as the audio data is correct even if the system is brought into the asynchronous state. However, when the unit frames which do not include the error check pattern are input, the correctness of the audio data cannot be checked. In this case, if the synchronization detector 3 outputs the synchronization detection error signal, the audio data cannot be decoded even if the audio data is correct, thereby resulting in a problem of causing an interruption of sound. As an example of the unit frames that do not include the error check pattern, some types of unit frames are known constituting the bit stream which is encoded according to an MPEG audio encoding system.

SUMMARY OF THE INVENTION

The present invention is implemented to solve the foregoing problem. It is therefore an object of the present invention to provide a sound reproducing system and sound reproducing method capable of decoding the audio data as long as the audio data is correct, even if the detection of a syncword fails.

According to a first aspect of the present invention, there is provided a sound reproducing system comprising: detection means for detecting a syncword included in each frame constituting a bit stream; re-detection means for detecting, when the detection means fails in detecting the syncword, a syncword included in a subsequent frame; checking means for checking, when the re-detection means succeeds in detecting the syncword, correctness of bit stream information included in the subsequent frame; and decoding means for decoding, when the checking means verifies the correctness of the bit stream information, audio data in the frame with which the detection means fails to detect the syncword.

Here, the checking means may carry out CRC (cyclic redundancy check) when the frame includes CRC data, and the decoding means may halt decoding of audio data when the checking means detects a CRC error.

The sound reproducing system may further comprise error processing means for executing an error processing when the re-detection means fails in detecting the syncword.

The sound reproducing system may further comprise error processing means for executing an error processing when the checking means denies the correctness of the bit stream information.

The detection means may detect the syncword in the present frame with reference to previous bit stream information whose correctness is verified by the checking means.

The re-detection means may detect the syncword in the subsequent frame with reference to previous bit stream information whose correctness is verified by the checking means.

The re-detection means may detect, if the detection means fails to detect the syncword in the present frame, the syncword in the subsequent frame with reference to bit stream information extracted from the present frame.

The re-detection means may detect the syncword in the subsequent frame by searching a predetermined range in which the syncword is likely to be present.

According to a second aspect of the present invention, there is provided a sound reproducing method comprising the steps of: carrying out a detection processing of a syncword included in each frame constituting a bit stream; carrying out, if the syncword cannot be detected, a detection processing of a syncword included in a subsequent frame; checking, when the syncword included in the subsequent frame is detected, correctness of bit stream information included in the subsequent frame; and decoding, when the correctness of the bit stream information included in the subsequent frame is verified, audio data in the frame with which the detection of the syncword fails.

The sound reproducing method may further comprise the steps of carrying out CRC (cyclic redundancy check) when the frame includes CRC data, and halting decoding the audio data in the frame if a CRC error is detected.

The sound reproducing method may further comprise the step of carrying out an error processing if the syncword cannot be detected in the subsequent frame.

The sound reproducing method may further comprise the step of carrying out an error processing if the correctness of the bit stream information is denied.

DETAILED DESCRIPTION OF THE PREFERRED EMBODIMENTS

The invention will now be described with reference to the accompanying drawings.

Embodiment 1

Figure 1:
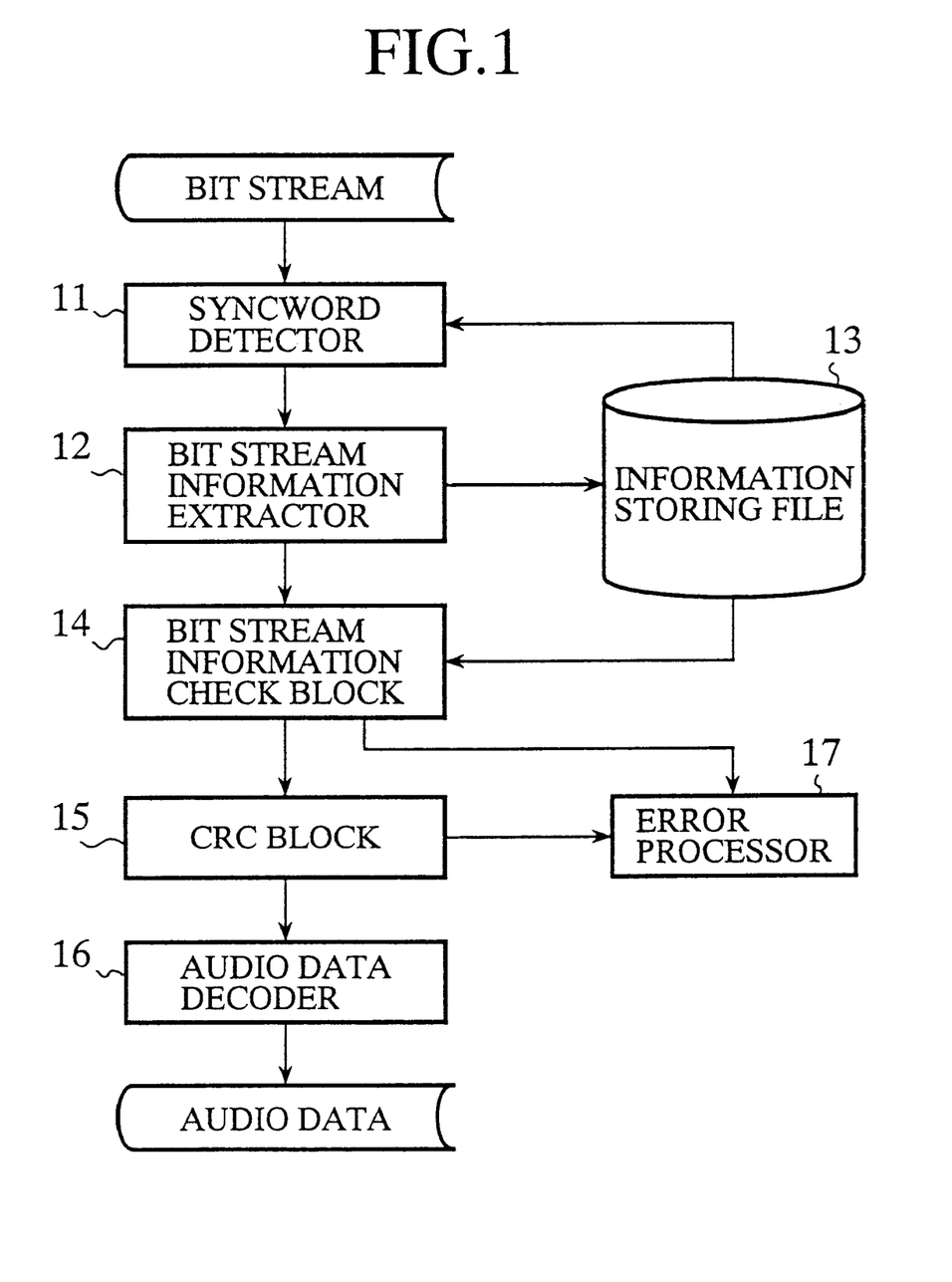
FIG. 1 is a block diagram showing an embodiment 1 of a sound reproducing system in accordance with the present invention.

FIG. 1 is a block diagram showing an embodiment 1 of the sound reproducing system in accordance with the present invention. In FIG. 1, the reference numeral 11 designates a syncword detector that detect the syncword at the initial position of a frame constituting a bit stream, and detects, if it fails to detect the syncword, the syncword at the initial position of a subsequent frame; 12 designates a bit stream information extractor that extracts, when the syncword detector 11 detects the syncword, the bit stream information following the syncword; 13 designates an information storing file for storing the bit stream information; 14 designates a bit stream information check block for checking the correctness of the bit stream information extracted by the bit stream information extractor 12; and 15 designates a CRC block that carries out the CRC when the frame contains CRC data, and when the bit stream information check block 14 proves the correctness of the bit stream information.

The reference numeral 16 designates an audio data decoder for decoding the audio data when the CRC block 15 does not detect any CRC error; and 17 designates an error processor that carries out an error processing such as a mute processing or interpolation processing when the syncword detector 11 does not detect the syncword, when the bit stream information check block 14 denies the correctness of the bit stream information, or when the CRC block 15 detects the CRC error.

Figure 2:
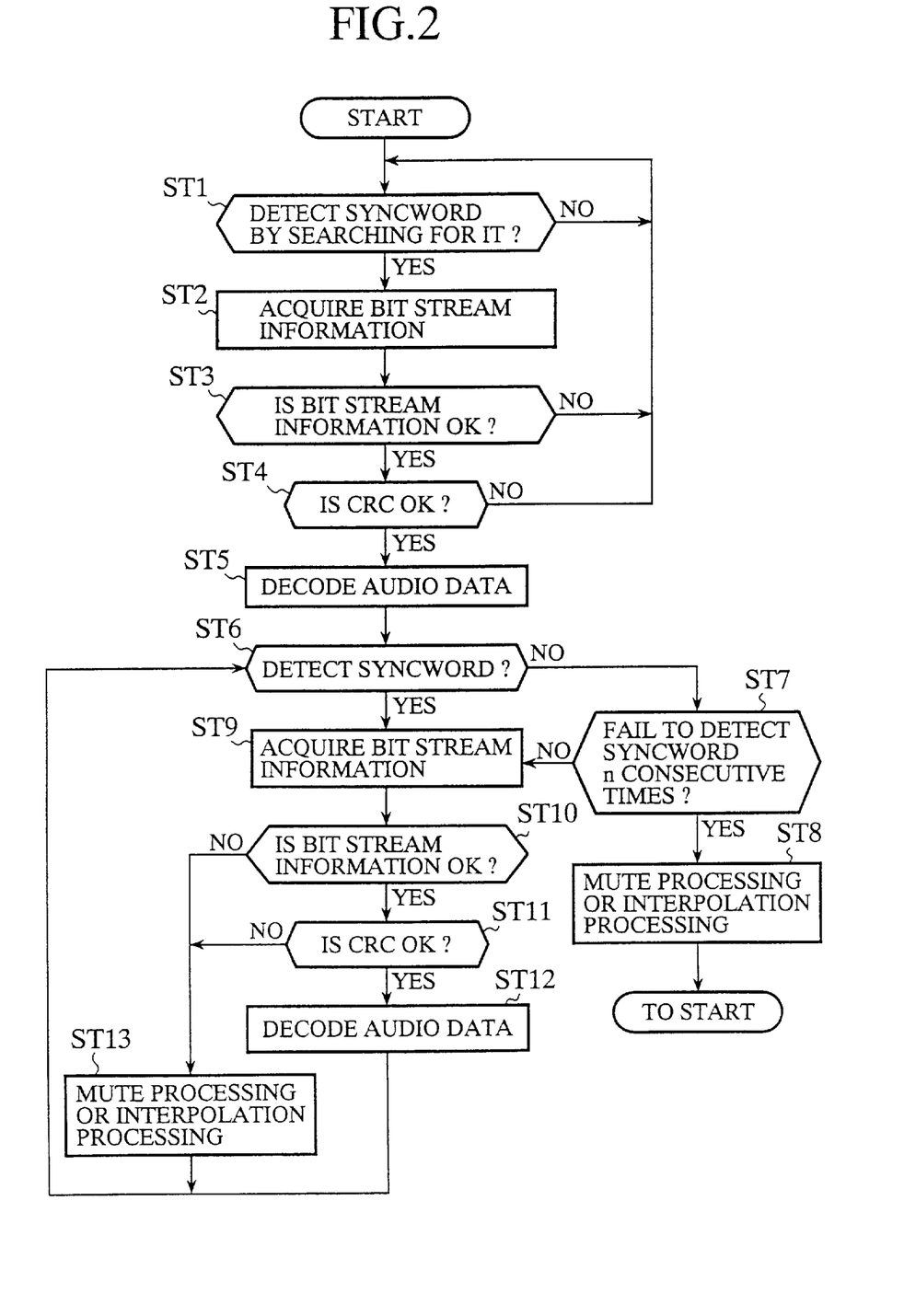
FIG. 2 is a flowchart illustrating a sound reproducing method in the embodiment 1.

Next, the operation of the present embodiment 1 will be described with reference to FIG. 2 illustrating a flowchart of the sound reproducing method of the present embodiment 1.

Figure 3:
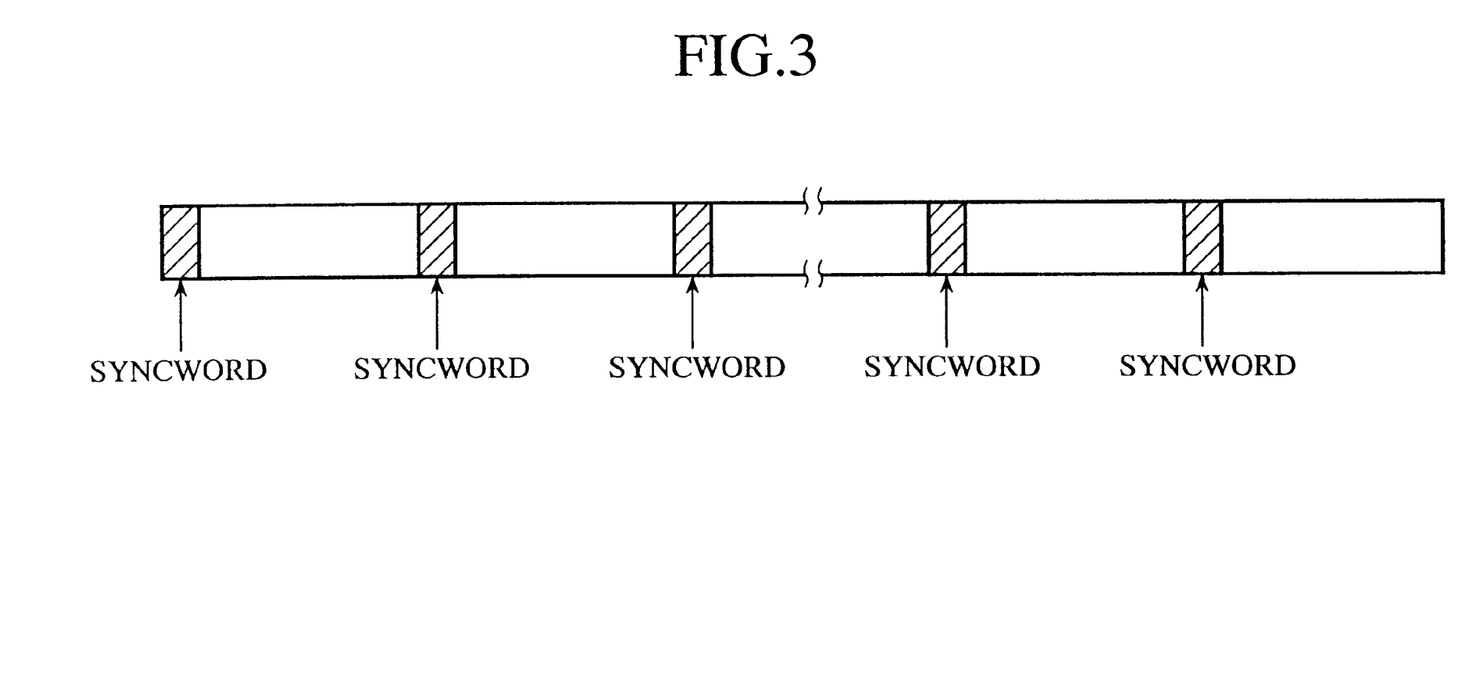
FIG. 3 is a diagram illustrating detection of a syncword.

First, the sound reproducing system makes a decision that the synchronization is established when a data stream called a syncword is detected in the bit stream, and that the synchronization is not established when the syncword is not detected (see, FIG. 3).

Accordingly, the syncword detector 11 starts, when the bit stream is supplied from the input terminal, a search processing of the syncword to detect the syncword at the initial position of a frame (step ST1).

Figure 4:
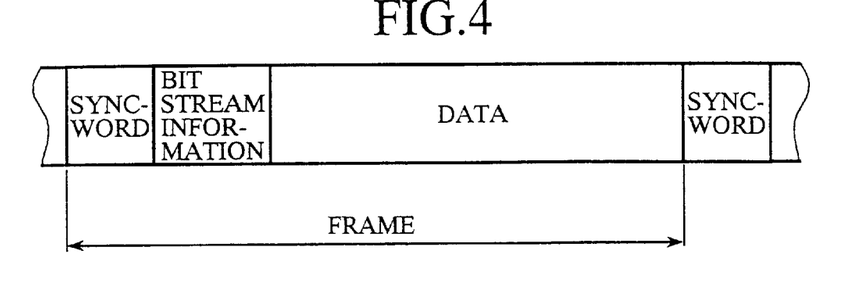
FIG. 4 is a diagram illustrating a frame structure of a bit stream.

The syncword detector 11 continues the search processing of the syncword until it detects the syncword. When the syncword detector 11 detects the syncword, the bit stream information extractor 12 extracts the bit stream information following the syncword as shown in FIG. 4 (step ST2), and stores the bit stream information in the information storing file 13. Here, the bit stream information includes information about a frame length, frame sampling frequency and the like.

When the bit stream information extractor 12 extracts the bit stream information, the bit stream information check block 14 checks the correctness of the bit stream information (step ST3).

Figure 5:
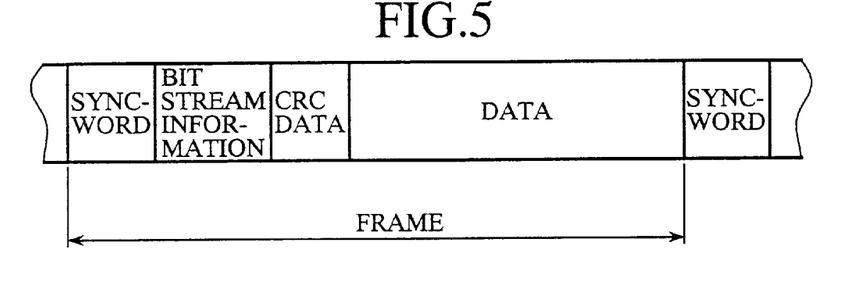
FIG. 5 is a diagram illustrating another frame structure of the bit stream.
Figure 6:
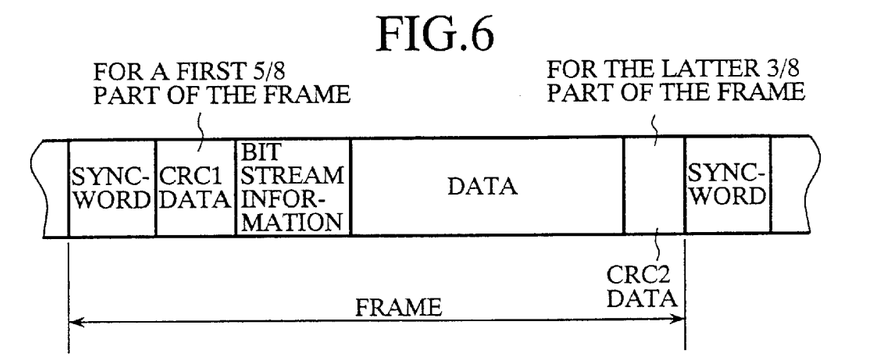
FIG. 6 is a diagram illustrating still another frame structure of the bit stream.

If the check result of the bit stream information check block 14 is negative, it is very likely that the audio data includes some error, in which case, the syncword detector 11 carries out the detection processing of the syncword again. On the other hand, if the check result is positive, the CRC block 15 carries out, when the frame includes the CRC data as shown in FIG. 5 or 6, the CRC to check a data error of the audio data (step ST4). Incidentally, the frame does not include the CRC data in some encoding systems as shown in FIG. 3.

If the CRC block 15 detects the data error of the audio data, the syncword detector 11 retries the detection processing of the syncword. In contrast, when the CRC block 15 does not detect any data error of the audio data, the audio data decoder 16 decodes the audio data in the current frame (step ST5).

Thus, when the synchronization establishment is verified by the detection of the syncword, the audio data in the present frame is decoded as long as the audio data is without error. This, however, does not verify that the audio data in the next frame is free from an error. Thus, when the next frame is supplied from the input terminal, the syncword detector 11 carries out the detection processing of the syncword at the initial position of the next frame in the same manner as described above (step ST6).

Figure 7:
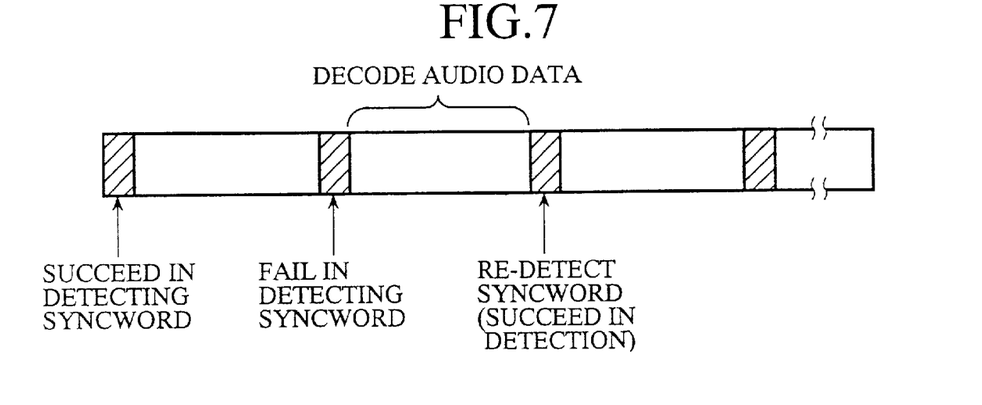
FIG. 7 is a diagram illustrating detection of a syncword.

When the syncword detector 11 succeeds in detecting the syncword, the bit stream information extractor 12 extracts the bit stream information following the syncword in the same fashion as described above (step ST9). In contrast with this, if the syncword detector 11 fails to detect the syncword, it carries out the detection processing of the syncword at the initial position of subsequent frames as shown in FIG. 7.

If the syncword detector 11 fails to detect the syncword n consecutive times (step ST7), it is highly probable that not only the syncword, but also the audio data includes some error. Thus, the error processor 17 carries out at step ST8 the error processing such as a mute processing (fade-out) or interpolation processing (which outputs the previously decoded audio data). On the other hand, if the syncword detector 11 detects the syncword before the n consecutive failures, the bit stream information extractor 12 extracts the bit stream information following that syncword (step ST9).

When the syncword detector 11 succeeds in detecting the syncword from the beginning without any failure, the bit stream information and CRC data are checked as described above, and the audio data in that frame is decoded (steps ST10–ST12). On the other hand, if the syncword detector 11 has once failed in detecting the syncword, and then detects a subsequent syncword, the bit stream information check block 14 checks the correctness of the bit stream information not of the frame with which the detection of the syncword fails, but of the frame with which the detection of the syncword succeeds (step ST10).

If the check result produced by the bit stream information check block 14 denies the correctness of the bit stream information, it is very likely that the audio data in the frame with which the detection of the syncword fails also includes an error. Thus, the error processor 17 carries out the error processing such as the mute processing or interpolation processing (step ST13).

In contrast, when the check result produced by the bit stream information check block 14 verifies the correctness of the bit stream information, and when the frames include the CRC data, the CRC block 15 performs the CRC on the basis of the CRC data in the frame with which the detection of the syncword failed, to check the data error of the audio data in that frame (step ST11).

If the CRC block 15 detects a data error of the audio data, it is highly probable that the audio data in the frame with the failed syncword includes some error. Accordingly, the error processor 17 carries out the error processing such as the mute processing or interpolation processing (step ST13).

On the other hand, when the CRC block 15 does not detect any data error of the audio data, it is highly probable that the audio data in the frame with the failed syncword does not include any error. Hence, the audio data decoder 16 decodes the audio data in the frame with the failed syncword as illustrated in FIG. 7 (step ST12).

As described above, the present embodiment 1 is arranged such that even if it fails to detect the syncword, if the syncword in a subsequent frame is detected, if the correctness of the bit stream information included in that subsequent frame is proved, and if no CRC error is detected, the audio data in the frame(s) with the failed syncword is decoded. This enables the audio data to be decoded as long as the data error is not detected in the audio data, even if the detection of the syncword does not succeed. As a result, it has an advantage of being able to prevent interruption of sound from taking place.

Embodiment 2

Although in the foregoing embodiment 1 the syncword detector 11 detects the syncword by carrying out the search processing of the syncword, the syncword detector 11 can also detect the next syncword by predicting the position of the syncword at the initial position of the next frame.

Figure 8:
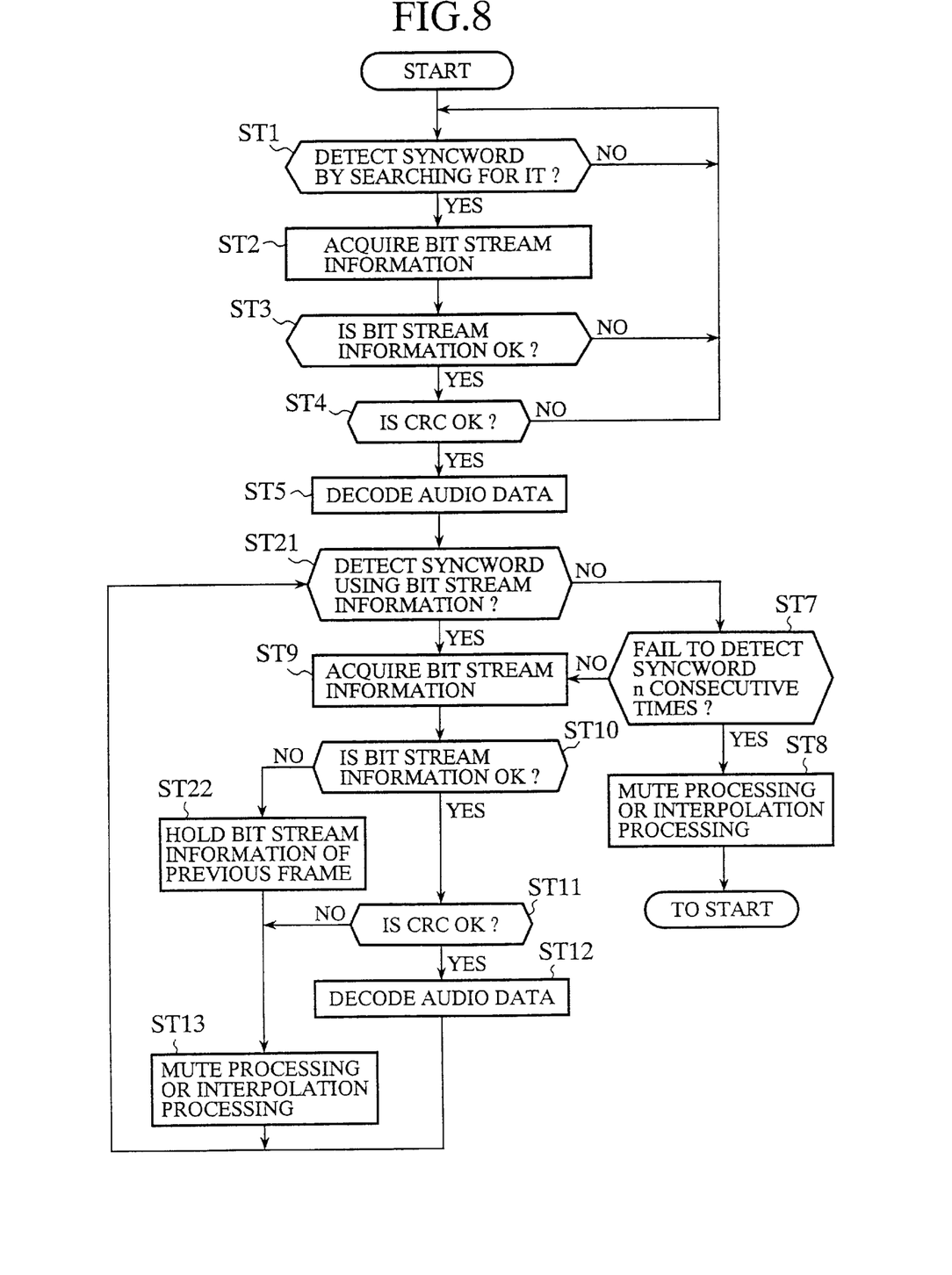
FIG. 8 is a flowchart illustrating an embodiment 2 of the sound reproducing method in accordance with the present invention.

Specifically, if the check result from the bit stream information check block 14 denies the correctness of the bit stream information, the previous bit stream information with its correctness verified is stored in the information storing file 13 as illustrated in FIG. 8 (step ST22).

In response to this, when detecting the syncword at the initial position of the next frame, the syncword detector 11, skipping the search processing of that syncword, predicts the position of the syncword at the initial position of the next frame with reference to the previous bit stream information, and detects the syncword in accordance with the prediction (step ST21), thereby trying to achieve quick detection of the syncword.

Thus, the present embodiment 2 is configured such that the syncword detector 11 detects the syncword included in a frame with reference to the previous bit stream information whose correctness is proved by the bit stream information check block 14. As a result, even if some of the bits of the syncword and bit stream information change on the transmission line, the next syncword can be detected without re-searching for it as long as the frame is transmitted whose bit stream information is the same as that of the previous frame. This offers an advantage of being able to detect the syncword quickly.

Embodiment 3

Figure 9:
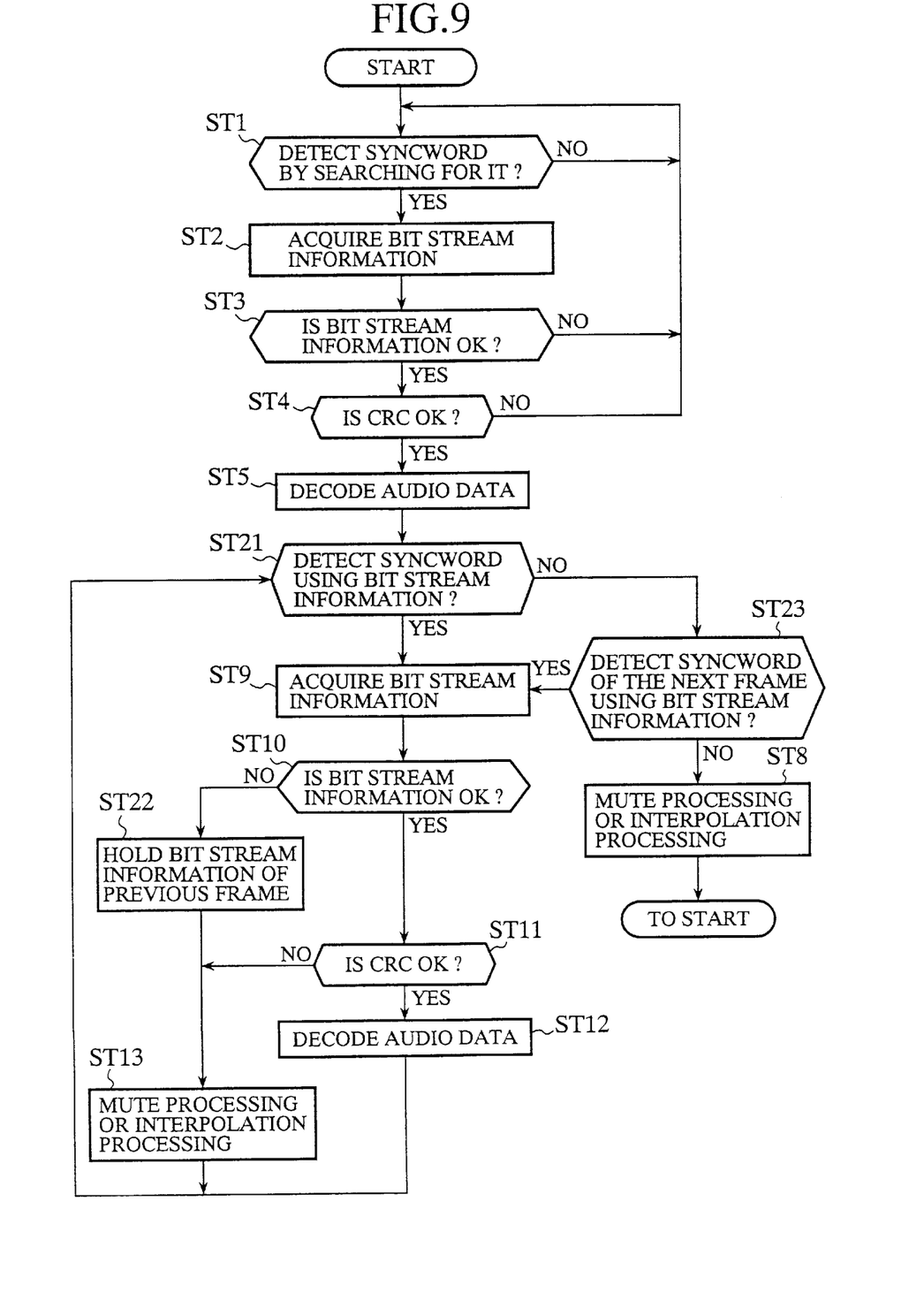
FIG. 9 is a flowchart illustrating an embodiment 3 of the sound reproducing method in accordance with the present invention.

In the foregoing embodiment 2, the previous bit stream information, the correctness of which is verified by the bit stream information check block 14, is referred to by the syncword detector 11 to detect the syncword in the next frame. The previous bit stream, however, can also be referred to when the syncword detector 11 fails to detect the syncword, and retries to detect another syncword as illustrated in FIG. 9 (step ST23).

This offers an advantage of being able to accelerate the detection rate when re-detecting the syncword.

Embodiment 4

In the foregoing embodiment 3, the re-detection of the syncword is carried out with reference to the previous bit stream information. In contrast, the present embodiment 4 is arranged such that its syncword detector 11 detects, if it fails to detect the syncword, a syncword by extracting the bit stream information of the frame with which the detection of the syncword fails, by verifying the correctness of that bit stream information, and by detecting, when the verification result is positive, the syncword with reference to the bit stream information.

Figure 10:
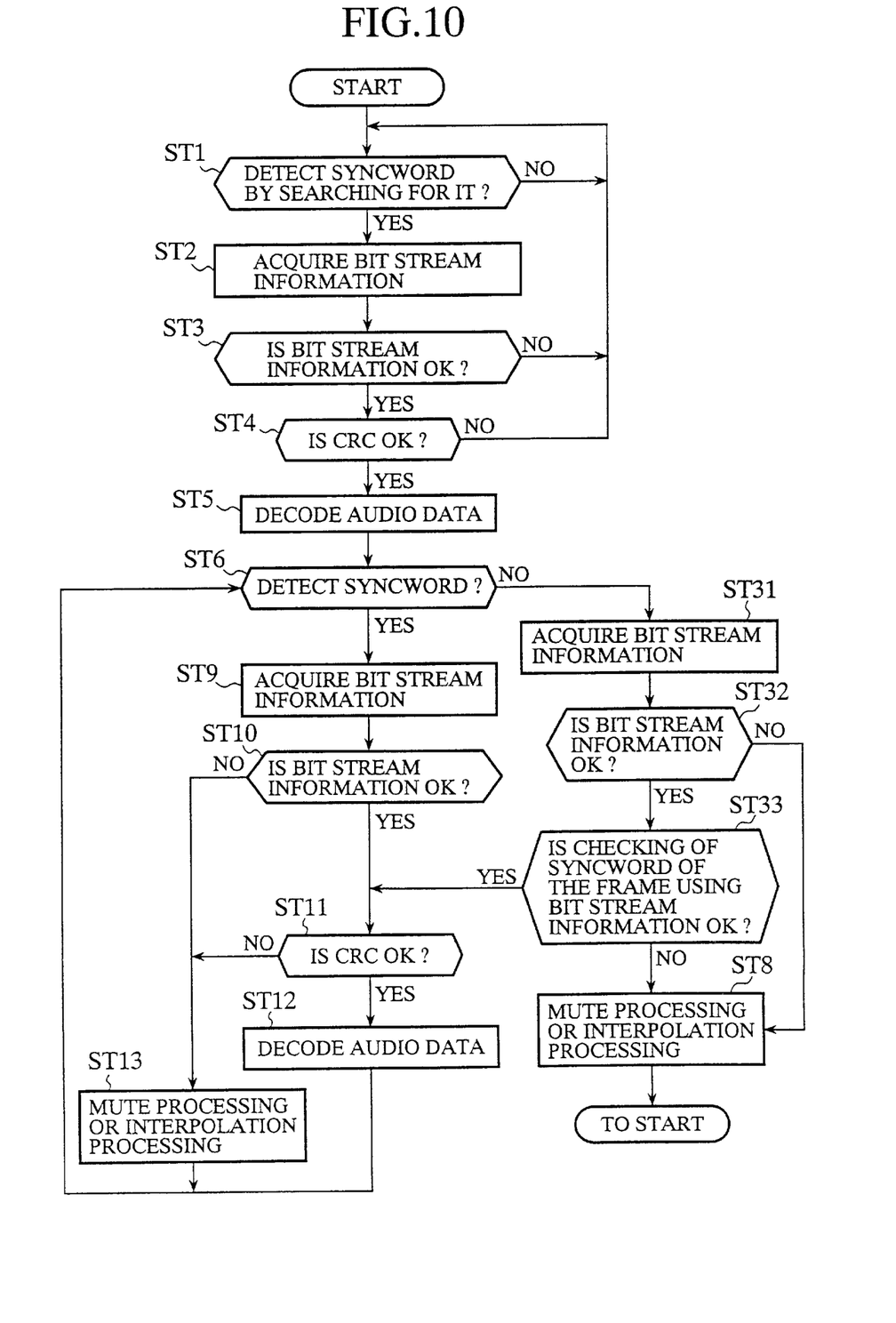
FIG. 10 is a flowchart illustrating an embodiment 4 of the sound reproducing method in accordance with the present invention.

More specifically, if the syncword detector 11 fails to detect the syncword, the bit stream information extractor 12 extracts, at step ST31 in FIG. 10, the bit stream information from the frame with which the detection of the syncword failed.

Subsequently, the bit stream information check block 14 checks the correctness of the bit stream information (step ST32), and the syncword detector 11 carries out, if the check result is positive, the detection processing of the syncword with reference to the bit stream information, and performs the CRC (step ST11) if the syncword is detected (step ST33).

Thus, even if the detection of the syncword fails, if the data error is not detected in the audio data, that is, if the correctness of the bit stream information is verified and no CRC error is detected, the audio data can be decoded as in the foregoing embodiments 1–3. This achieves an advantage of being able to prevent the interruption of sound from occurring.

Embodiment 5

Figure 11:
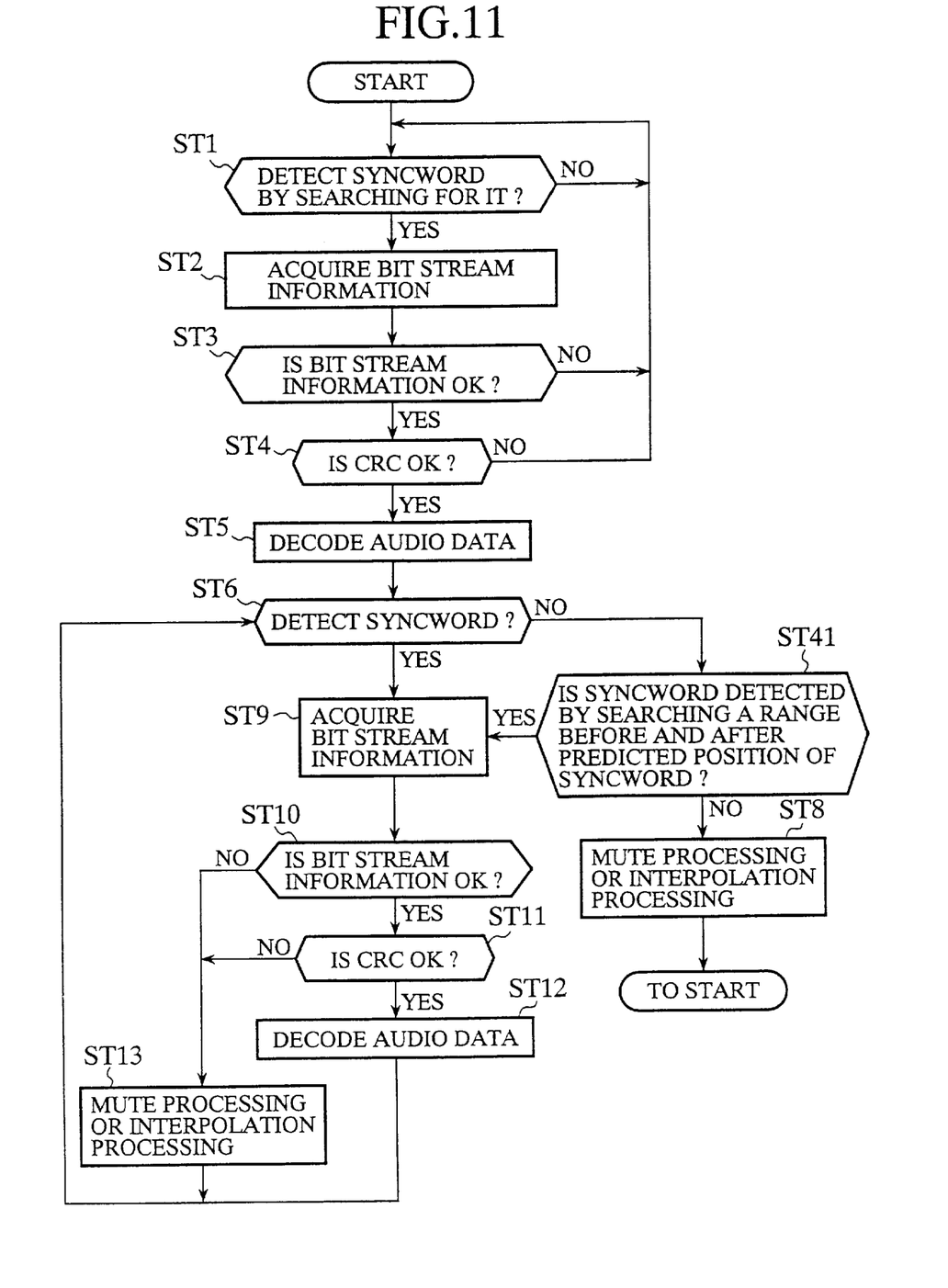
FIG. 11 is a flowchart illustrating an embodiment 5 of the sound reproducing method in accordance with the present invention.
Figure 12:
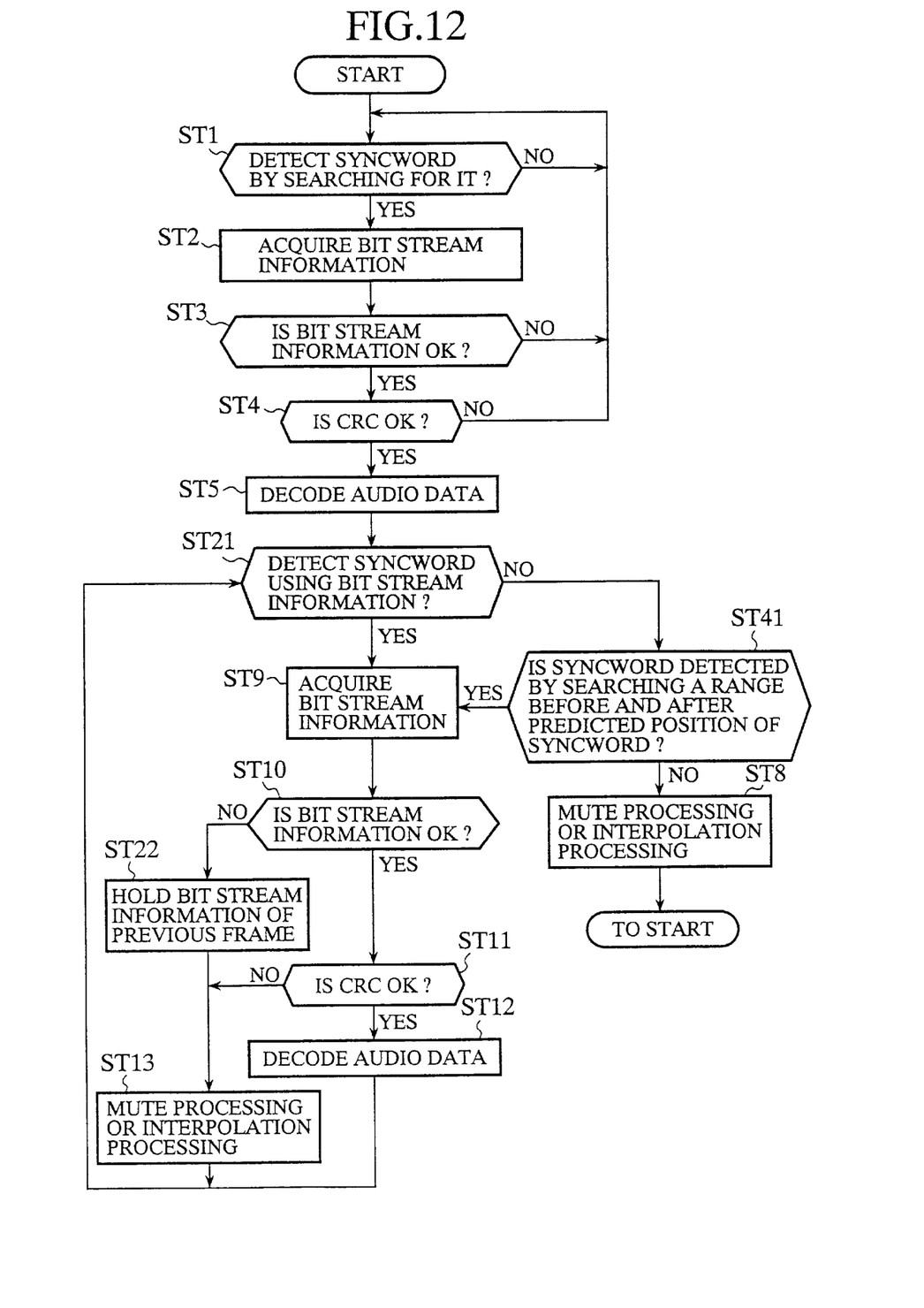
FIG. 12 is another flowchart illustrating the embodiment 5 of the sound reproducing method in accordance with the present invention.

Although the foregoing embodiment 3 detects the syncword with reference to the previous bit stream information when re-detecting the syncword, a present embodiment 5 is arranged such that it detects the syncword by searching a particular range in which the syncword is likely to be present as illustrated in FIGS. 11 and 12 (step ST41).

Since this restricts the search range, the present embodiment 5 has an advantage of being able to detect the syncword quickly as in the foregoing embodiment 3.

What is claimed is:

1. A sound reproducing system comprising:

detection means for detecting a syncword included in each frame constituting a bit stream;

re-detection means for detecting, when said detection means fails in detecting the syncword, a syncword included in a subsequent frame;

checking means for checking, when said re-detection means succeeds in detecting the syncword, correctness of bit stream information included in said subsequent frame; and decoding means for decoding, when said checking means verifies the correctness of the bit stream information, audio data in the frame with which said detection means fails to detect the syncword.

2. The sound reproducing system as claimed in claim 1, wherein said checking means carries out CRC (cyclic redundancy check) when the frame includes CRC data, and wherein said decoding means halts decoding of audio data when said checking means detects a CRC error.

3. The sound reproducing system as claimed in claim 1, further comprising error processing means for executing an error processing when said re-detection means fails in detecting the syncword.

4. The sound reproducing system as claimed in claim 1, further comprising error processing means for executing an error processing when said checking means denies the correctness of the bit stream information.

5. The sound reproducing system as claimed in claim 1, wherein said detection means detects the syncword in the present frame with reference to previous bit stream information whose correctness is verified by said checking means.

6. The sound reproducing system as claimed in claim 1, wherein said re-detection means detects the syncword in the subsequent frame with reference to previous bit stream information whose correctness is verified by said checking means.

7. The sound reproducing system as claimed in claim 1, wherein said re-detection means detects, if said detection means fails to detect the syncword in the present frame, the syncword in the subsequent frame with reference to bit stream information extracted from the present frame.

8. The sound reproducing system as claimed in claim 1, wherein said re-detection means detects the syncword in the subsequent frame by searching a predetermined range in which said syncword is likely to be present.

9. A sound reproducing method comprising the steps of:

carrying out a detection processing of a syncword included in each frame constituting a bit stream;

carrying out, if the syncword cannot be detected, a detection processing of a syncword included in a subsequent frame;

checking, when the syncword included in the subsequent frame is detected, correctness of bit stream information included in the subsequent frame; and decoding, when the correctness of the bit stream information included in the subsequent frame is verified, audio data in the frame with which the detection of the syncword fails.

10. A sound reproducing method comprising the steps of:

carrying out a detection processing of a syncword included in each frame constituting a bit stream;

carrying out, if the syncword cannot be detected, a detection processing of a syncword included in a subsequent frame;

checking, when the syncword included in the subsequent frame is detected, correctness of bit stream information included in the subsequent frame;

decoding, when the correctness of the bit stream information included in the subsequent frame is verified, audio data in the frame with which the detection of the syncword fails; and carrying out CRC (cyclic redundancy check) when the frame includes CRC data, and halting decoding the audio data in the frame if a CRC error is detected.

11. The sound reproducing method as claimed in claim 9, further comprising the step of carrying out an error processing if the syncword cannot be detected in the subsequent frame.

12. The sound reproducing method as claimed in claim 9, further comprising the step of carrying out an error processing if the correctness of the bit stream information is denied.

* * * * *